United States Patent
Rosinski et al.

[11] 3,970,544
[45] July 20, 1976

[54] HYDROCARBON CONVERSION WITH ZSM-12

[75] Inventors: Edward Joseph Rosinski, Pedricktown; Mae Koenig Rubin, Bala Cynwyd, both of Pa.

[73] Assignee: Mobil Oil Corporation, New York, N.Y.

[22] Filed: Feb. 28, 1975

[21] Appl. No.: 553,950

Related U.S. Application Data

[60] Continuation-in-part of Ser. No. 467,334, May 6, 1974, abandoned, which is a division of Ser. No. 125,749, March 18, 1971, Pat. No. 3,832,449.

[52] U.S. Cl. ............................... 208/111; 208/120; 252/455 Z
[51] Int. Cl.$^2$ ................. C10G 13/02; C10G 11/04; B01J 29/28
[58] Field of Search ............................ 208/111, 120

[56] References Cited
UNITED STATES PATENTS

| | | | |
|---|---|---|---|
| 3,306,922 | 2/1967 | Barrer et al. | 260/448 C |
| 3,308,069 | 3/1967 | Wadlinger et al. | 252/455 Z |
| 3,578,398 | 5/1971 | Jenkins | 423/328 |
| 3,692,470 | 9/1972 | Ciric | 423/328 |
| 3,700,585 | 10/1972 | Chen et al. | 208/111 |
| 3,702,886 | 11/1972 | Argauer et al. | 423/328 |
| 3,709,979 | 1/1973 | Chu | 423/328 |

*Primary Examiner*—Delbert E. Gantz
*Assistant Examiner*—G. E. Schmitkons

[57] ABSTRACT

The specification discloses conversion of hydrocarbons using, as catalyst, a crystalline zeolite designated ZSM-12. The zeolite has the following composition:

$$1.0 \pm 0.4\ M_2O\ .\ W_2O\ .\ 20\text{--}200\ YO_2\ .\ ZH_2O$$

where M is at least one cation and $n$ is the valence thereof, W is aluminum or gallium, Y is silicon or germanium, and Z is a value ranging from 0 to 60. In a preferred synthesized form, M is a mixture of alkali metal cations, especially sodium, and tetraalkylammonium cations. These zeolites are characterized by a specified x-ray powder diffraction pattern. Catalytically-active forms of said zeolites are used in a wide variety of hydrocarbon conversion reactions.

7 Claims, 1 Drawing Figure

HYDROCARBON CONVERSION WITH ZSM-12

CROSS-REFERENCE TO RELATED APPLICATIONS

This application is a continuation-in-part of Ser. No. 467,334, filed May 6, 1974, now abandoned, which in turn is a Divisional of Ser. No. 125,749, filed Mar. 18, 1971 and now U.S. Pat. No. 3,832,449.

BACKGROUND OF THE INVENTION

1. Field of the Invention

This invention relates to novel zeolites and to methods for their preparation. More particularly, this invention relates to novel crystalline aluminosilicates having catalytic properties, to methods for preparing the same, and hydrocarbon conversion therewith.

2. Description of the Prior Art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra-containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K, or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other conventional symbol, as illustrated by zeolite A (U.S. Pat. No. 2,882,243), zeolite X (U.S. Pat. No. 2,882,244), zeolite Y (U.S. Pat. No. 3,130,007), zeolite K-G (U.S. Pat. No. 3,055,654), zeolite ZK-5 (U.S. Pat. No. 3,247,195), zeolite Beta (U.S. Pat. No. 3,308,069), and zeolite ZK-4 (U.S. Pat. No. 3,314,752), merely to name a few.

SUMMARY OF THE INVENTION

The present invention relates to a novel group of crystalline materials hereinafter designated as ZSM-12, to methods for their preparation and to hydrocarbon conversion processes conducted therewith. ZSM-12 compositions can be identified in terms of mole ratios of oxides as follows:

$$1.0 \pm 0.4 M_{2/n}O \cdot W_2O_3 \cdot 20\text{-}200 YO_2 \cdot zH_2O$$

wherein M is a cation, n is the valence of said cation, W is selected from the group consisting of aluminum and gallium, Y is selected from the group consisting of silicon and germanium and z is from 0 to 60. In a preferred synthesized form M is selected from the group consisting of a mixture of alkali metal cations, especially sodium, and tetraalkylammonium cations, the alkyl groups preferably containing 2–5 carbon atoms. Alternately, the reaction mixture obtained from the mixing of an alkylamine and a n-alkyl halide or sulfate or other alkylating agent can be used in place of the tetraethylammonium cations. The term reaction mixture encompasses either the mixture of tertiary amine and alkylating agent or a mixture of the aforesaid tertiary amine and alkylating agent.

The original cations can be replaced in accordance with techniques well-known, at least in part, by ion exchange with other cations. Preferred replacing cations include metal ions, ammonium ions, hydrogen ions and mixtures of the same.

In a preferred embodiment of ZSM-12, W is aluminum, Y is silicon and the silica/alumina mole ratio is at least 50 and ranges up to about 120.

ZSM-12 zeolites possess a definite distinguishing crystalline structure whose x-ray diffraction pattern shows the following significant lines:

TABLE 1

| INTERPLANAR SPACING D (A) | RELATIVE INTENSITY |
|---|---|
| 11.9 ± 0.2 | M |
| 10.1 ± 0.2 | M |
| 4.76 ± 0.1 | W |
| 4.29 ± 0.08 | VS |
| 3.98 ± 0.08 | M |
| 3.87 ± 0.07 | VS |
| 3.49 ± 0.07 | W |
| 3.38 ± 0.07 | M |
| 3.20 ± 0.06 | W |
| 3.05 ± 0.05 | W |
| 2.54 ± 0.03 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. In Table 1 the relative intensities are given in terms of the symbols S = strong, M = medium, MS = medium strong, MW = medium weak and VS = very strong. It should be understood that this X-ray diffraction pattern is characteristic of all the species of ZSM-12 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The X-ray diffraction pattern of ZSM-12 can be indexed in the monoclinic system with lattice parameters having the following values:

$$a_o = 12.6 \pm 0.2 \text{A}$$

$$b_o = 11.1 \pm 0.2 \text{A}$$

$$c_o = 24.4 \pm 0.4 \text{A}$$

and the angle = $108° \pm 1°$.

ZSM-12 zeolites are useful in cracking and hydrocracking and in other petroleum refining processes indicating the unique catalytic characteristics of this family of zeolites. The latter processes include reduction of pour point of paraffinic charge stocks; isomerization of n-paraffins and naphthenes polymerization of compounds containing an olefinic or acetylinic carbon to carbon linkage such as isobutylene, butene-1 and butadiene; reforming, alkylation, isomerization of polyalkyl substituted aromatics, e.g., ortho xylene and disproportionation of aromatics, such as toluene to provide a mixture of benzene, xylenes and higher methylbenzenes; dehydration, hydration, dehydrogenation. The ZSM-12 catalysts have exceptional high selectivity and under the conditions of hydrocarbon conversion provide a high percentage of desired products relative to total products compared with known zeolitic hydrocarbon conversion catalysts.

ZSM-12 zeolites, as indicated above, are also useful in catalytic processes, such as catalytic cracking of hydrocarbon and hydrocracking. In addition to the thermal stability of this family of zeolites under these conditions, they provide conversion of the cracked oil to materials having lower molecular weights and boiling points which are of greater economic value. The ability to be physically stable under high temperatures and/or in the presence of high temperature steam is extremely important for a cracking catalyst. During catalytic conversion, the reaction which takes place is essentially cracking to produce hydrocarbons. However, this cracking is accompanied by a number of complex side reactions such as aromatization, polymerization, alkylation and the like. As a result of these complex reactions, a carbonaceous deposit is laid down on the catalyst which is referred to by petroleum engineers as "coke." The deposit of coke on the catalyst tends to seriously impair the catalyst efficiency for the principal reaction desired and to substantially decrease the rate of conversion and/or the selectivity of the process. Thus, it is common to remove the catalyst after coke has been deposited thereon and to regenerate it by burning the coke in a stream of oxidizing gas. The regenerated catalyst is returned to the conversion stage of the process cycle. The enhanced thermal stability of ZSM-12 is advantageous in this regard.

ZSM-12 zeolites can be used either in the alkali metal form, e.g., the sodium form; the ammonium form; the hydrogen form; or the multivalent forms or combinations of these forms are employed. They can also be used in intimate combination with a hydrogenating component such as tungsten, vanadium, molybdenum, rhenium, nickel, cobalt, chromium, manganese, or a noble metal such as platinum or palladium where a hydrogenation or dehydrogenation function is to be performed. Such component can be exchanged into the composition, impregnated therein or physically intimately admixed therewith. Such component can be impregnated in or on to ZSM-12 such as, for example, in the case of platinum, treating the zeolite with a platinum metal-containing ion. Thus, suitable platinum compounds include chloroplantinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cation complex, e.g., Pt $(NH_3)_6Cl_4$ is particularly useful. For some hydrocarbon conversion processes, this noble metal form of the ZSM-12 catalyst is unnecessary such as in low temperature, liquid phase ortho xylene isomerization.

When ZSM-12 is employed as an adsorbent or as a catalyst in one of the aforementioned processes partial dehydration of the ZSM-12 material is necessary. This can be accomplished by heating to a temperature to about 200 to about 600°C. in an atmosphere such as air, nitrogen or the like, at atmospheric or subatmospheric pressures for between 1 and 48 hours. Dehydration can also be performed at lower temperatures by placing the ZSM-12 catalyst in a vacuum, however, a longer time is required to obtain a sufficient amount of dehydration.

Zeolite ZSM-12 can be suitably prepared by preparing a solution containing tetraethyl ammonium cations, sodium oxide, an oxide of aluminum or gallium, an oxide of silica or germanium, and water and having a composition, in terms of mole ratios of oxides, falling within the following ranges:

TABLE 2

| | Broad | Preferred | Particularly Preferred |
|---|---|---|---|
| $OH^-/YO_2$ | 0.05 – 0.40 | 0.15– 0.25 | 0.17 – 0.20 |
| $R_4N^+/(R_4N^++Na^+)$ | 0.2 – 0.95 | 0.28 – 0.90 | 0.3 – 0.5 |
| $H_2O/OH^-$ | 20 – 300 | 5.0 – 100 | 80 – 100 |
| $YO_2/W_2O_3$ | 49 – 300 | 85 – 125 | 90 – 100 | wherein R is ethyl, W is aluminum or gallium and Y is silicon or germanium maintaining the mixture until crystals of the zeolite are formed. Thereafter, the crystals are separated from the liquid and recovered. Typical reaction conditions consist of heating the foregoing reaction mixture to a temperature of from about 80°C to 180°C for a period of time of from about six hours to 150 days. A more preferred temperature range is from about 150°C to 170°C with the amount of time at a temperature in such range being from about 5 days to 12 days.

ZSM-12 is preferentially synthesized from a mixture containing a high silica to alumina ratio for example more than 85 to 1, especially at crystallization temperatures of 212°F. At this temperature, if the silica to alumina ratio drops to 50, conditions favor the formation of beta zeolite.

When the reaction product of triethylamine and diethylsulfate is used in the synthesis of ZSM-12 temperatures of under 175°C should be maintained. Higher temperatures favor the formation of other zeolites.

The digestion of the gel particles is carried out until crystals form. The solid product is separated from the reaction medium, as by cooling the whole to room temperature, filtering and water washing.

The foregoing product is dried, e.g., at 230°F, for from about 16 to 24 hours. Of course, milder conditions may be employed if desired, e.g., room temperature under vacuum.

ZSM-12 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetraethylammonium compounds, e.g., tetraethylammonium bromide. It will be understood that each oxide component utilized in the reaction mixture for preparing a member of the ZSM-12 family can be supplied by one of more initial reactants and they can be mixed together in any order. For example, sodium oxide can be supplied by an aqueous solution of sodium hydroxide, or by an aqueous solution of sodium silicate; tetraethylammonium cation can be supplied by tetraethylammonium hydroxide, tetraethylammonium bromide or by a mixture of diethylsulfate and triethylamine. The reaction mixture can be prepared either batchwise or continuously. Crystal size and crystallization time of the ZSM-12 composition will vary with the nature of the reaction mixture employed.

DESCRIPTION OF SPECIFIC EMBODIMENTS

Figure 1:
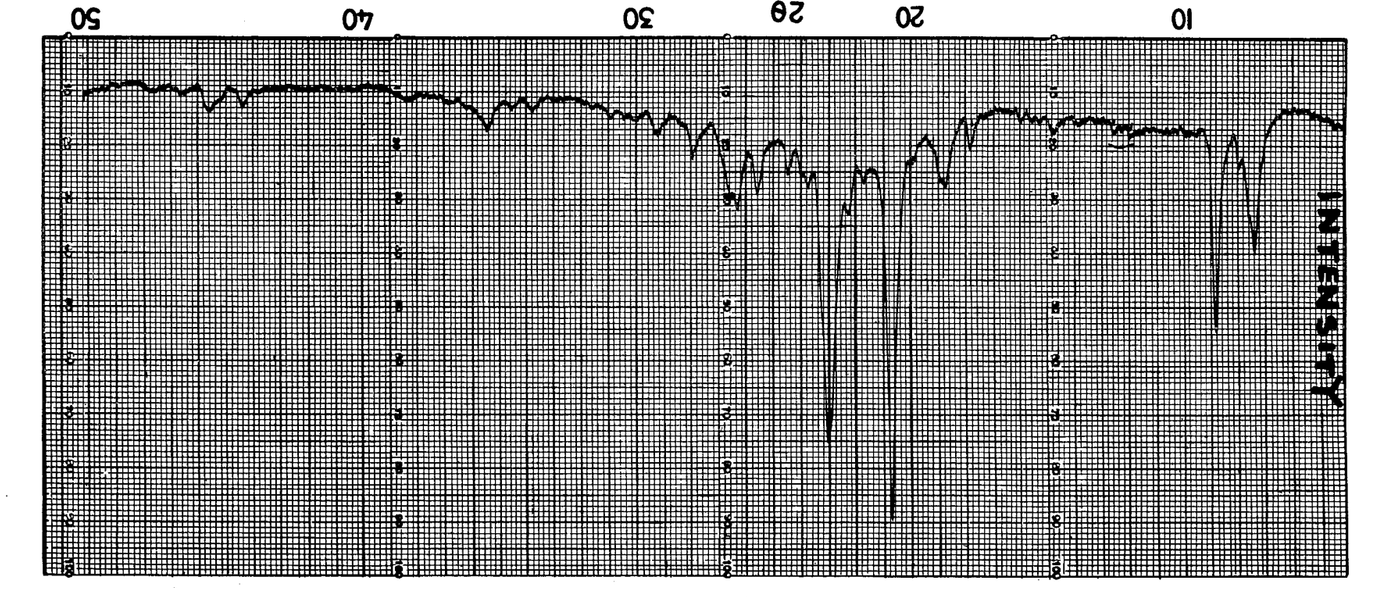
FIG. 1 is an X-ray diffraction graph of the ZSM-12 product of Example 1.

ZSM-12 zeolites can have the original cations associated therewith replaced by a wide variety of other cations according to techniques well known in the art. Typical cations would include hydrogen, ammonium and metal cations including mixtures of the same. Of the replacing metallic cations, particular preference is given to cations off metals such as rare earth metals, manganese, calcium, as well as metals of Group II of the Periodic Table, e.g., zinc, and Group VIII of the Periodic Table, e.g., nickel.

Typical ion exchange techniques would be to contact the ZSM-12 zeolites with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolites are then preferably washed with water and dried at a temperature ranging from 150°F to 1500°F for periods of time ranging from 1 to 48 hours or more.

Regardless of the cations replacing the sodium in the synthesized form of the ZSM-12 the spatial arrangement of the aluminum, silicon and oxygen atoms which form the basic crystal lattices of ZSM-12, remains essentially unchanged by the described replacement of sodium or other alkali metal as determined by taking an X-ray powder diffraction pattern of the ion-exchanged material. Such X-ray diffraction pattern of the ion-exchanged ZSM-12 reveals a pattern substantially the same as that set forth in Table 1 above.

The aluminosilicates prepared by the instant invention are formed in a wide variety of particular sizes. Generally speaking, the particles can be on the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-12 with another material resistant to the temperatures and other conditions employed in organic conversion processes. Such materials include active and inactive materials and synthetic or naturally occuring zeolites as well as inorganic materials such as clays, silica and/or metal oxides. The latter may be either naturally occurring or in the form of gelatinous precipicates or gels including mixtures of silica and metal oxides. Use of a material in conjunction with the ZSM-12, i.e., combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed for the purpose of improving the crush strength of the catalyst.

Naturally occurring clays which can be composited with the ZSM-12 catalyst include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM-12 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-12 and the inorganic oxide gel matrix vary widely with the crystalline aluminosilicate content ranging from about 1 to 90 percent by weight and more usually, particularly when the composite is prepared in the form of beads in the range of about 2 to about 50 percent by weight of the composite.

Employing the ZSM-12 catalyst of this invention, containing a hydrogenation component, heavy petroleum residual stocks, cycle stocks, and other hydrocrackable charge stocks can by hydrocracked at temperatures between 400°F and 825°F using molar ratios of hydrogen to hydrocarbon charge in the range between 2 and 80. The pressure employed will vary between 10 and 2,500 psig and the liquid hourly space velocity between 0.1 and 10.

Employing the catalyst of this invention for catalytic cracking, hydrocarbon cracking stocks can be cracked at a liquid hourly space velocity between about 0.5 and 50, a temperature between about 550°F and 1100°F, a pressure between about subatmospheric and several hundred atmospheres.

Employing a catalytically active form of the ZSM-12 zeolite of this invention containing a hydrogenation component, reforming stocks can be reformed employing a temperature between 700°F and 1000°F. The pressure can be between 100 and 1000 psig but is preferably between 200 and 700 psig. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins, when provided with a hydrogenation component, e.g., platinum. Hydroisomerization is carried out at a temperature between 200° and 700°F, preferably 300° to 550°F, with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin or aromatic isomerization employing temperatures between 30°F and 500°F.

The catalyst can also be used for reducing the pour point of gas oils. This reduction is carried out at a liquid hourly space velocity between about 10 and about 30 and a temperature between about 800°F and about 1100°F.

Other reactions which can be accomplished employing the catalyst of this invention containing a metal, e.g., platinum, include hydrogenation-dehydrogenation reactions and desulfurization reactions.

In order to more fully illustrate the nature of the invention and the manner of practicing the same, the following examples are presented.

In the examples which follow whenever adsorption data is set forth it was determined as follows:

A weighed sample of the zeolite was contacted with the desired pure adsorbate vapor in an adsorption chamber at a pressure less than the vapor-liquid equilibrium pressure of the adsorbate at room temperature. This pressure was kept constant during the adsorption period which did not exceed about eight hours. Adsorption was complete when a constant pressure in the adsorption chamber was reached, i.e., 12 mm of mercury for water and 20 mm for n-hexane and cyclohexane. The increase in weight was calculated as the adsorption capacity of the sample.

It should be noted that in the analysis of the zeolite the value for nitrogen can exceed 1.4 by reason of occluded organic nitrogen compound in the crystalline product.

EXAMPLE I 100 grams of colloidal silica sol (30% $SiO_2$) was added to a mixture of
 a. 4 grams of NaOH (97%) and
 b. 22 grams of reaction mixture obtained from the slow addition of 154 grams of diethyl sulfate to a flask containing 101 grams of triethylamine. The temperature was maintained at 104°C until the refluxing had stopped.
 c. 1.2 grams of $NaAlO_2$ (41.8% $Al_2O_3$, 31.6% $Na_2O$)
 d. 70 grams of water The resulting solution had the following composition expressed in terms of mole ratios.

$$\frac{RN^+}{RN^+ + Na^+} = 0.43$$

$$\frac{OH^-}{SiO_2} = 0.20 \quad \frac{H_2O}{OH^-} = 78 \quad \frac{SiO_2}{Al_2O_3} = 100$$

This solution was mixed for 15 minutes and then crystallized at 352°F in a glass lined stainless steel static reactor for 12 days. The resultant solid product was cooled to room temperature, removed, filtered, washed with water and dried at 230°F. Chemical analysis of the product showed the formula to be:

0.89 $R_2O$:0.11 $Na_2O$:$Al_2O_3$:44.8 $SiO_2$

Where R = organic ammonium ion.

The sorption properties of the product, calcined for 5 hours at 1000°F, were as follows:
 cyclohexane — 3.5 wt. percent adsorbed
 hexane — 4.6 wt. percent adsorbed
 $H_2O$ — 4.7 wt. percent adsorbed A portion of the non-calcined product was subjected to X-ray analysis and identified as ZSM-12. The material exhibited the X-ray powder diffraction pattern essentially as shown in Table 3.

TABLE 3

| X-ray Data for Example I | |
|---|---|
| d(A°) | $I/I_o$ |
| 11.9 | 27 |
| 11.6 | 10 |
| 11.15 | 10 |
| 10.02 | 35 |
| 9.72 | 5 |
| 8.93 | 2 |
| 8.55 | 2 |
| 7.43 | 3 |
| 7.08 | 3 |
| 6.66 | 1 |
| 6.37 | 2 |
| 6.02 | 5 |
| 5.86 | 3 |
| 5.69 | 4 |
| 5.57 | 5 |
| 5.00 | 2 |
| 4.96 | 5 |
| 4.82 | 3 |
| 4.75 | 14 |
| 4.70 | 11 |
| 4.45 | 6 |
| 4.28 | 100 |
| 4.10 | 8 |
| 3.98 | 14 |
| 3.85 | 67 |
| 3.75 | 5 |
| 3.71 | 9 |
| 3.65 | 7 |
| 3.545 | 1 |
| 3.485 | 16 |
| 3.39 | 20 |
| 3.36 | 11 |
| 3.20 | 10 |
| 3.16 | 3 |
| 3.135 | 2 |
| 3.08 | 1 |
| 3.06 | 3 |

EXAMPLE II

Example I was repeated except that the crystallization was carried out at 354°F for 10 days and the product was calcined at 1000°F for 24 hours. The product composition expressed in mole ratios was as follows:

$R_2O = 1.40$  $Na_2O = 0.20$
$Al_2O_3 = 1.00$  $SiO_2 = 94.0$

The sorption properties of the calcined product were as follows:
cyclohexane — 1.6 wt. percent adsorbed
hexane — 3.4 wt. percent adsorbed
$H_2O$ — 4.7 wt. percent adsorbed X-ray analysis showed the product to be ZSM-12. The material exhibited the x-ray powder diffraction pattern essentially as shown in Table 4.

TABLE 4

| X-Ray Diffraction Data For Example II | |
|---|---|
| dA | I/I$_o$ |
| 11.9 | 29 |
| 11.6 | 14 |
| 11.1 | 9 |
| 10.0 | 23 |
| 9.7 | 1 |
| 7.4 | 2 |
| 6.37 | 2 |
| 6.03 | 3 |
| 5.83 | 2 |
| 5.70 | 1 |
| 5.56 | 3 |
| 5.16 | 1 |
| 4.98 | 3 |
| 4.75 | 12 |
| 4.67 | 11 |
| 4.44 | 5 |
| 4.27 | 81 |
| 4.08 | 8 |
| 3.98 | 14 |
| 3.86 | 100 |
| 3.75 | 7 |
| 3.71 | 6 |
| 3.65 | 6 |
| 3.55 | 3 |
| 3.48 | 14 |
| 3.39 | 15 |
| 3.34 | 14 |
| 3.20 | 9 |
| 3.15 | 2 |
| 3.05 | 6 |
| 2.98 | 2 |
| 2.94 | 1 |
| 2.89 | 3 |
| 2.66 | 2 |
| 2.60 | 1 |
| 2.53 | 7 |
| 2.44 | 2 |
| 2.35 | 1 |
| 2.32 | 1 |

EXAMPLE III

This example illustrates another example of the preparation of ZSM-12. 200 grams of colloidal silica sol (30% $SiO_2$) was added to the following solution:
a. 7.0 grams of NaOH (97%)
b. 40 grams of tetraethylammonium bromide
c. 2.4 grams of $NaAlO_2$ (41.8% $Al_2O_3$, 31.6% $Na_2O$)
d. 140 grams of water.

The resulting solution had the following composition expressed in terms of mole ratios.

$$\frac{RN^+}{RN^+ + Na^+} = 0.46 \quad \frac{OH^-}{SiO_2} = 0.18 \quad \frac{H_2O}{OH^-} = 88$$

$$\frac{SiO_2}{Al_2O_3} = 100$$

$RN^+$ = tetraethylammonium ion

The solution was mixed for 15 minutes and then crystallized at a temperature of 212°F in a polypropylene jar for 103 days. The resultant solid product was cooled to room temperature, removed, filtered, washed with water and dried at 130°F. A portion of the product was subjected to x-ray analysis and identified as ZSM-12. The material exhibited the x-ray powder diffraction pattern essentially shown in Table 5. A portion of the product was calcined at 1000°F for 24 hours and the following analysis, expressed in terms of mole ratios of oxides, was obtained.

$Na_2O = 0.58$ $Al_2O_3 = 1.00$ $SiO_2 = 77.4$

The sorption properties of the calcined product were as follows:
cyclohexane = 11.4 wt. percent adsorbed
hexane = 9.3 wt. percent adsorbed
$H_2O$ = 7.8 wt. percent adsorbed

TABLE 5

| X-Ray Diffraction Data For Example III | |
|---|---|
| dA | I/I$_o$ |
| 11.9 | 36 |
| 11.6 | 16 |
| 11.0 | 8 |
| 10.1 | 18 |
| 8.6 | 1 |
| 7.6 | 2 |
| 6.7 | 1 |
| 6.44 | 3 |
| 6.17 | 2 |
| 6.05 | 4 |
| 5.83 | 3 |
| 5.59 | 1 |
| 5.37 | 2 |
| 4.98 | 3 |
| 4.76 | 19 |
| 4.67 | 3 |
| 4.45 | 5 |
| 4.29 | 100 |
| 4.10 | 10 |
| 3.96 | 38 |
| 3.87 | 72 |
| 3.76 | 5 |
| 3.63 | 3 |
| 3.56 | 2 |
| 3.49 | 18 |
| 3.38 | 26 |
| 3.20 | 10 |
| 3.16 | 2 |
| 3.08 | 4 |
| 3.04 | 6 |
| 2.94 | 2 |
| 2.89 | 4 |
| 2.83 | 2 |
| 2.69 | 2 |
| 2.66 | 3 |
| 2.59 | 3 |
| 2.54 | 8 |
| 2.48 | 2 |
| 2.44 | 2 |
| 2.35 | 4 |
| 2.32 | 2 |

EXAMPLE IV

This example illustrates another example of the preparation of ZSM-12. In this particular example the source of hydroxyl ion is tetraethylammonium hydroxide.

100 grams of colloidal silica sol (30% $SiO_2$) was added to a mixture of
a. 1.4 grams of $NaAlO_2$ (41.8% $Al_2O_3$, 31.6% $Na_2O$)
b. 25 grams of water
c. 45 grams of $(C_2H_5)_4NOH$ (40% solution)

This mixture has the following composition in terms of mole ratios where $RN^+$ = tetraethylammonium ion.

$$\frac{RN^+}{RN^+ + Na^+} = 0.89 \quad \frac{OH^-}{SiO_2} = 0.25 \quad \frac{H_2O}{OH^-} = 54$$

$$\frac{SiO_2}{Al_2O_3} = 87.5$$

This solution was mixed for 15 minutes and then crystallized at 352°F in a glass lined stainless steel static reactor for 7 days. The resultant solid product was cooled to room temperature, removed, filtered, washed with water, and dried at 230°F. A portion of the product was subjected to x-ray analysis and identified at ZSM-12. A portion of the product was calcined at 1000°F for 24 hours and the product had the following analysis.

$$Na_2O = 0.21 \ Al_2O_3 = 1.00 \ SiO_2 = 60.4$$

The sorption properties of the calcined product were as follows:
cyclohexane = 8.1 wt. percent adsorbed
hexane = 8.7 wt. percent adsorbed
$H_2O$ = 8.5 wt. percent adsorbed

EXAMPLE V

This example employed one-half the amount of reactants as used in Example III except for the amount of $NaAlO_2$ which was 1.0 gram in this example. The reactant mixture had the following composition in terms of mole ratios where $RN^+$ = tetraethylammonium ion.

$$\frac{RN^+}{RN^+ + Na^+} = 0.49 \quad \frac{OH^-}{SiO_2} = 0.17 \quad \frac{H_2O}{OH^-} = 90 \quad \frac{SiO_2}{Al_2O_3} = 125$$

The solution was mixed for 15 minutes and then crystallized at 212°F in a polypropylene jar for 59 days. The resultant solid product was cooled to room temperature, removed, filtered, washed with water, and dried at 230°F. A portion of the product was subjected to x-ray analysis and identified as ZSM-12. The material exhibited the x-ray diffraction pattern essentially as shown in Table 6. A portion of the product was calcined at 1000°F for 18 hours and the product had the following analysis expressed in mole ratios of oxides.

$$Na_2O = 0.30 \ Al_2O_3 = 1.00 \ SiO_2 = 68.6$$

The sorption properties of the calcined product were as follows:
cyclohexane = 6.7 wt. percent adsorbed
hexane = 6.3 wt. percent adsorbed
water = 4.2 wt. percent adsorbed

TABLE 6

| X-Ray Diffraction Data For Example V | |
|---|---|
| dA | I/Io |
| 11.9 | 40 |
| 11.6 | 20 |
| 11.0 | 7 |
| 10.2 | 25 |
| 8.7 | 2 |
| 6.44 | 1 |
| 6.19 | 2 |
| 6.07 | 2 |
| 4.97 | 5 |
| 4.77 | 15 |
| 4.67 | 15 |
| 4.44 | 12 |
| 4.29 | 100 |
| 4.09 | 9 |
| 3.98 | 17 |
| 3.87 | 80 |
| 3.76 | 5 |
| 3.63 | 5 |
| 3.49 | 17 |
| 3.38 | 25 |
| 3.20 | 10 |
| 3.10 | 2 |
| 3.05 | 4 |
| 2.7 | 1 |
| 2.65 | 5 |
| 2.60 | 2 |
| 2.54 | 7 |

EXAMPLE VI 100 grams of colloidal silica sol (30% $SiO_2$) was added to a mixture of
a. 3.5 grams of NaOH (97%)
b. 21 grams of triethylamine - ethyl sulfate reaction mixture as prepared in Example I.
c. 1.2 grams of $NaAlO_2$ (41.8% $Al_2O_3$, 31.6% $Na_2O$)
d. 70 grams of water.

The resulting solution had the following composition expressed in terms of mole ratios where $RN^+$ = organic ammonium cations.

$$\frac{RN^+}{RN^+ + Na^+} = 0.45 \quad \frac{OH^-}{SiO_2} = 0.17 \quad \frac{H_2O}{OH^-} = 90 \quad \frac{SiO_2}{Al_2O_3} = 100$$

The solution was mixed for 15 minutes and then crystallized at 212°F in a polypropylene jar for 97 days. The resultant solid product was cooled to room temperature, removed, filtered, washed with water, and dried at 230°F. A portion of the product was subjected to x-ray analysis and identified as ZSM-12. A portion of the product was calcined at 1000°F for 22 hours and the product had the following composition expressed in mole ratios of oxides.

$$Na_2O = 0.30 \ Al_2O_3 = 1.00 \ SiO_2 = 68.6$$

The sorption properties of the calcined material were as follows:
cyclohexane = 8.4 wt. percent adsorbed
hexane = 7.5 wt. percent adsorbed
$H_2O$ = 6.0 wt. percent adsorbed

EXAMPLE VII

The same reactants and procedure as Example VI were used except that 10 grams of tetraethylammonium bromide was used as the source of quaternary ion. The resulting mixture had the following composition expressed in mole ratios.

$$\frac{RN^+}{RN^+ + Na^+} = 0.28 \quad \frac{OH^-}{SiO_2} = 0.20 \quad \frac{H_2O}{OH^-} = 90 \quad \frac{SiO_2}{Al_2O_3} = 100$$

The solution was mixed for 15 minutes and then crystallized at 212°F in a polypropylene jar for 146 days. The resultant solid product was cooled to room temperature, removed, filtered, washed with water and dried at 230°F. A portion of the product was subjected to x-ray analysis and identified as ZSM-12.

The sorption properties of the calcined product were as follows:
cyclohexane = 9.8 wt. percent adsorbed
hexane = 8.8 wt. percent adsorbed
water = 6.7 wt. percent adsorbed

EXAMPLE VIII 500 grams of colloidal silica sol (30% $SiO_2$) was added to a mixture of:
a. 17.5 grams of NaOH (97%)
b. 96.2 grams of $(C_2H_5)_4NBr$
c. 5.0 grams of $NaAlO_2$ (41.8% $Al_2O_3$, 31.6% $Na_2O$)

The solution was mixed for 15 minutes and then crystallized at 212°F in a polypropylene jar for 84 days. The resultant solid product was cooled to room temperature, removed, filtered, washed with water and dried at 230°F. A portion of the product was subjected to x-ray analysis and identified as ZSM-12. The material exhibited the x-ray diffraction pattern essentially as shown in Table 7. A portion of the product was calcined at 1000°F for 17 hours and the product had the following composition expressed in mole ratios of oxides.

$Na_2O = 0.74$  $Al_2O_3 = 1.00$  $SiO_2 = 82.00$

The sorption properties of the calcined product were as follows:
cyclohexane = 10.7 wt. percent adsorbed
hexane = 8.4 wt. percent adsorbed
water = 7.9 wt. percent adsorbed

TABLE 7

X-Ray Diffraction Data For Example VIII

| dA | $I/I_o$ |
|---|---|
| 12.0 | 30 |
| 11.6 | 15 |
| 11.1 | 4 |
| 10.1 | 15 |
| 9.0 | 1 |
| 8.5 | 1 |
| 7.6 | 2 |
| 6.7 | 1 |
| 6.44 | 2 |
| 6.17 | 3 |
| 6.05 | 2 |
| 5.83 | 3 |
| 5.56 | 1 |
| 4.97 | 2 |
| 4.74 | 13 |
| 4.68 | 12 |
| 4.45 | 5 |
| 4.29 | 100 |
| 4.09 | 6 |
| 3.97 | 22 |
| 3.87 | 70 |
| 3.76 | 4 |
| 3.63 | 4 |
| 3.55 | 3 |
| 3.49 | 18 |
| 3.37 | 25 |
| 3.20 | 9 |
| 3.15 | 3 |
| 3.08 | 3 |
| 3.05 | 4 |
| 3.02 | 3 |
| 2.89 | 2 |
| 2.84 | 2 |
| 2.69 | 2 |
| 2.65 | 4 |
| 2.60 | 2 |
| 2.54 | 9 |
| 2.48 | 1 |
| 2.44 | 2 |
| 2.35 | 4 |
| 2.32 | 2 |

EXAMPLE IX

The product catalyst from Example I was ion-exchanged with 5 weight percent ammonium chloride. The contact time was 4 hours. The ion-exchanged product was then calcined in air at 1000°F to convert it to the acid form (HZSM-12). The HZSM-12 catalyst had the following sorption characteristics:
cyclohexane = 3.2 weight percent adsorbed
n-hexane = 7.7 weight percent adsorbed
$H_2O$ = 3.8 weight percent adsorbed This particular HZSM-12 catalyst had a surface area of 218 $m^2/g$.

EXAMPLE X

The following example illustrates the reduction of pour points and the production of olefins from straight chain compounds by the use of a ZSM-12 catalyst.

An Amal gas oil (650°–1000°F) having a pour point of 100°F, was charged over the product of Example IX (HZSM-12) at a L.H.S.V. of 20, a catalyst to oil ratio of 0.3 and at a temperature of 908°F for 10 minutes. This cracking process produced 19% of $C_2$–$C_5$ olefins at a conversion volume of 36%. In addition the 100°F pour Amal Gas Oil was converted to yield a $410^+$ product having a +5°F pour. Additionally 14.3 volume % $C_5^+$ gasoline was produced at this conversion level. About one-half the conversion products are $C_2$–$C_5$ olefins. This figure is an unexpected and highly desirable result.

EXAMPLE XI

The product catalyst from Example IV was ion exchanged and calcined in a manner similar to that of Example IX.

EXAMPLE XII

An Amal gas oil (650°–1000°F), having a pour point of 100°F was charged over the product of Example XI (HZSM-12) at a L.H.S.V. of 20, a catalyst to oil ratio of 0.3 and at a temperaure of 875°F for 10 minutes. This cracking process produced 16.80% of $C_2$–$C_5$ olefins at a conversion volume of 42.9. Additionally 17.5 volume percent $C_5+$ gasoline was produced at this conversion level. This example illustrates the high selectivity of the ZSM-12 catalysts to produce olefinic products.

The complete results of Example X and Example XII are given in the Table 8.

TABLE 8

|  | Example X Catalyst | Example XII Catalyst |
|---|---|---|
| Conversion, Volume% | 35.9 | 42.9 |
| $C_5+$ Gasoline, Volume% | 14.3 | 17.5 |
| Total $C_4$'s, Volume% | 15.0 | 12.1 |
| Dry Gas, Weight% | 12.2 | 14.7 |
| Coke, Weight% | 0.8 | 1.5 |
| $H_2$, Weight% | 0.05 | 0.07 |
| Pour Point, °F |  |  |

| Gas Distribution | Weight % | Volume % | Weight % | Volume % |
|---|---|---|---|---|
| $C_1$ | 0.15 |  | 00.17 |  |
| $C_2$-olefins | 1.56 |  | 1.82 |  |
| $C_2$ | 0.19 |  | 00.29 |  |
| $C_3$-olefins | 7.47 |  | 8.45 |  |
| $C_3$ | 2.80 |  | 3.89 |  |
| $C_4$-olefins | 7.11 | 10.2 | 4.80 | 6.83 |
| $C_4$ | 1.16 | 1.74 | 1.01 | 1.50 |
| $C_4$-isomers | 1.97 | 3.07 | 2.45 | 3.82 |
| $C_5$-olefins | 2.82 | 3.79 | 1.73 | 2.29 |
| $C_5$ | 0.47 | 0.66 | 0.33 | 0.45 |
| $C_5$-isomers | 0.58 | 0.82 | 0.54 | 0.79 |

WEIGHT RATIOS

| Example X |  | Example XII |  |
|---|---|---|---|
| $\dfrac{C_2\text{-olefins}}{C'2\text{-normal}}$ | = 8.2 | $\dfrac{C_2\text{-olefins}}{C_2\text{-normal}}$ | = 6.2 |
| $\dfrac{C_3\text{-olefins}}{C_3\text{-normal}}$ | = 2.7 | $\dfrac{C_3\text{-olefins}}{C_3\text{-normal}}$ | = 2.2 |

TABLE 8-continued $$\frac{C_4\text{-olefins}}{C_4\text{normal} + isoC_4} = 2.3 \qquad \frac{C_4\text{-olefins}}{C_4\text{-normal} + isoC_5} = 1.3$$

$$\frac{C_5\text{-olefinic}}{C_5\text{-normal} + isoC_5} = 2.6 \qquad \frac{C_5\text{-olefinic}}{C_5\text{-normal} + isoC_5} = 1.85$$

Total olefins = 19.0%    Total olefins = 16.8%

EXAMPLE XIII 37.5 grams of tetraethylammonium bromide were added to a solution containing 2.25 grams of $NaAlO_2$ (41.8% $Al_2O_3$, 31.6% $Na_2O$), 6.64 grams NaOH and 50 grams $H_2O$. 37.5 grams of colloidal $SiO_2$ (30% $SiO_2$) were finally added and the resulting gel mixed for 20 minutes. The gel was transferred to a polypropylene jar and held at 210°F for 90 days, without stirring.

The gel composition had the following mole ratios:
$RN^+/(RN^+ + Na^+)$: 0.49
$OH^-/SiO_2$ : 0.10
$H_2O/OH$ : 96
$SiO_2/Al_2O_3$ : 200

The resultant product was cooled to room temperature, removed, filtered, water-washed and dried at 230°F. A portion of the product was subjected to X-Ray analysis and identified as ZSM-12. The product had the following chemical analysis in mole ratios after calcination for 16 hours at 1000°F:

$1.03Na_2O : Al_2O_3 : 160SiO_2$

The sorption properties of the calcined product were as follows:
Cyclohexane : 8.4 wt. % absorbed
n-hexane : 7.5 wt. % absorbed
$H_2O$ :10.0 wt. % absorbed
Surface area:214 $M^2$/grm A further portion of the product was calcined at 1000°F for 10 hours and then contacted with 10% $NH_4CL$ solution for 4, one-hour contacts and one 1.5 hour contact at 85°–90°C with stirring. The sodium level was <0.01% after this exchange.

The exchanged material was calcined for 10 hours at 1000°F and evaluated for α activity. *

(* "α" activity is a measure of inherent ability of a catalyst to promote cracking and is fully defined and set forth in J. Cat. 4, No. 4, pp. 527–529, Miale & Weisz (August 1965).)

The α value was:(5 min) 75.1 (800°F, 1cc cat.) (25 min) 98.4 (800°F, 1cc cat.)

The X-ray diffraction data for the zeolite of Example XIII are set out in Table 9 below.

TABLE 9

| D | I/I$_o$ |
|---|---|
| 12.1 | 34 |
| 11.7 | 18 |
| 10.2 | 18 |
| 7.8 | 1 |
| 6.54 | 2 |
| 6.21 | 3 |
| 6.08 | 2 |
| 5.85 | 3 |
| 4.76 | 17 |
| 4.69 | 14 |
| 4.46 | 5 |
| 4.30 | 100 |
| 4.10 | 6 |
| 4.00 | 16 |
| 3.89 | 68 |
| 3.78 | 5 |
| 3.64 | 5 |
| 3.49 | 20 |
| 3.39 | 23 |
| 3.36 | 15 |
| 3.21 | 10 |
| 3.16 | 3 |
| 3.09 | 3 |
| 3.06 | 5 |
| 3.03 | 1 |
| 2.955 | 2 |
| 2.542 | 10 |

We claim:

1. A process for conversion of a hydrocarbon charge which comprises contacting said charge under conversion conditions with a catalyst comprising a zeolite the X-ray powder diffraction pattern of which manifests the interplanar spacings set forth in Table 1 of the specification when the zeolite is in the sodium-tetraethylammonium cationic form, said zeolite having, in terms of mole ratios of oxides, the formula:

$1 \pm 0.4 M_{2/n}O: W_2O_3: 20\text{--}200 YO_2 : zH_2O$ wherein M is at least one cation having a valance $n$, $z$ is between 0 and 60, W is aluminum or gallium and Y is silicon or germanium.

2. A process according to claim 1 wherein the zeolite is a crystalline aluminosilicate having, in terms of mole ratios of oxides, the formula:

$1 \pm 0.4 M_{2/n}O : Al_2O_3 : 20\text{--}200 SiO_2 : zH_2O$ wherein M is at least one cation having a valence $n$ and $z$ is between 0 and 60.

3. A process according to claim 2 wherein the mole ratio of $SiO_2$ to $Al_2O_3$ is between 50 and 120.

4. A process according to claim 2 wherein M comprises a cation selected from metal, alkylammonium ammonium, hydrogen and mixtures thereof.

5. A process according to claim 1 wherein said conversion is cracking and is carried out at a liquid hourly space velocity between about 0.5 and 50, a temperature between about 550°F and 1100°F and a pressure between about subatmospheric and several hundred atmospheres.

6. A process according to claim 1 wherein said conversion is hydrocracking and is carried out at a temperature between 400°F and 825°F, a hydrogen to hydrocarbon mole ratio between 2 and 80, a pressure between 10 and 2,500 p.s.i.g. and a liquid hourly space velocity between 0.1 and 10.

7. A process according to claim 5 wherein said space velocity is between about 10 and about 30 and said temperature is between about 800°F and 1100°F whereby the conversion product has a pour point lower than that of said charge.

* * * * *

UNITED STATES PATENT AND TRADEMARK OFFICE
CERTIFICATE OF CORRECTION

PATENT NO. : 3,970,544
DATED : July 20, 1976
INVENTOR(S) : Edward Joseph Rosinski and Mae Koenig Rubin It is certified that error appears in the above-identified patent and that said Letters Patent are hereby corrected as shown below:

Abstract formula: $1.0 \pm 0.4\ M_2O$ should read --$1.0 \pm 0.4\ M_{\frac{2}{n}}O$--

Column 4, line 44, "49 - 300" should read --40 - 300--

Signed and Sealed this

Twelfth Day of April 1977

[SEAL]

Attest:

RUTH C. MASON
*Attesting Officer*

C. MARSHALL DANN
*Commissioner of Patents and Trademarks*